Figure 1:
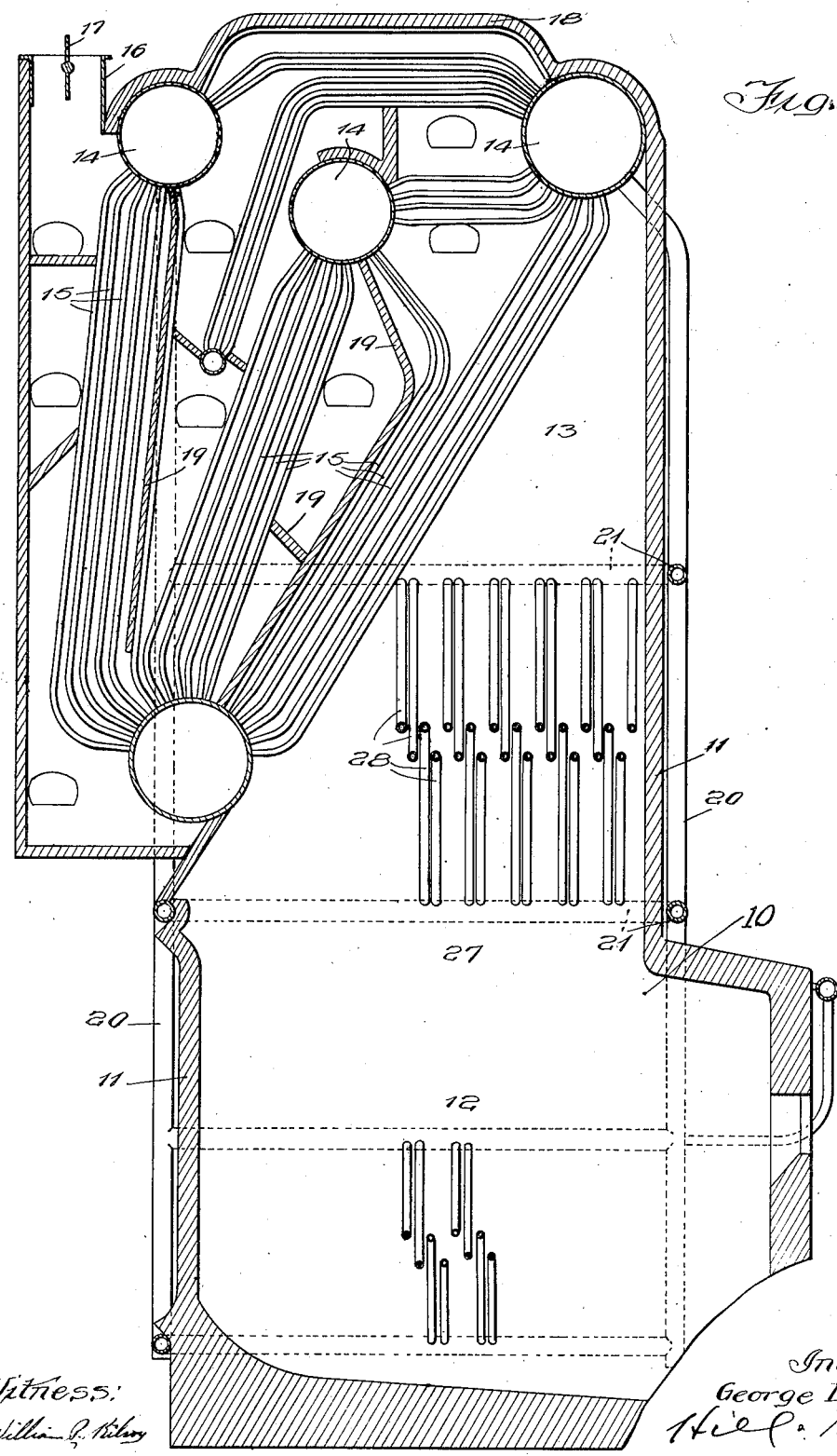

Jan. 23, 1934. G. LASKER 1,944,330
MIXING BARRIER AND SLAG SCREEN
Filed July 9, 1930 2 Sheets-Sheet 1

Inventor
George Lasker

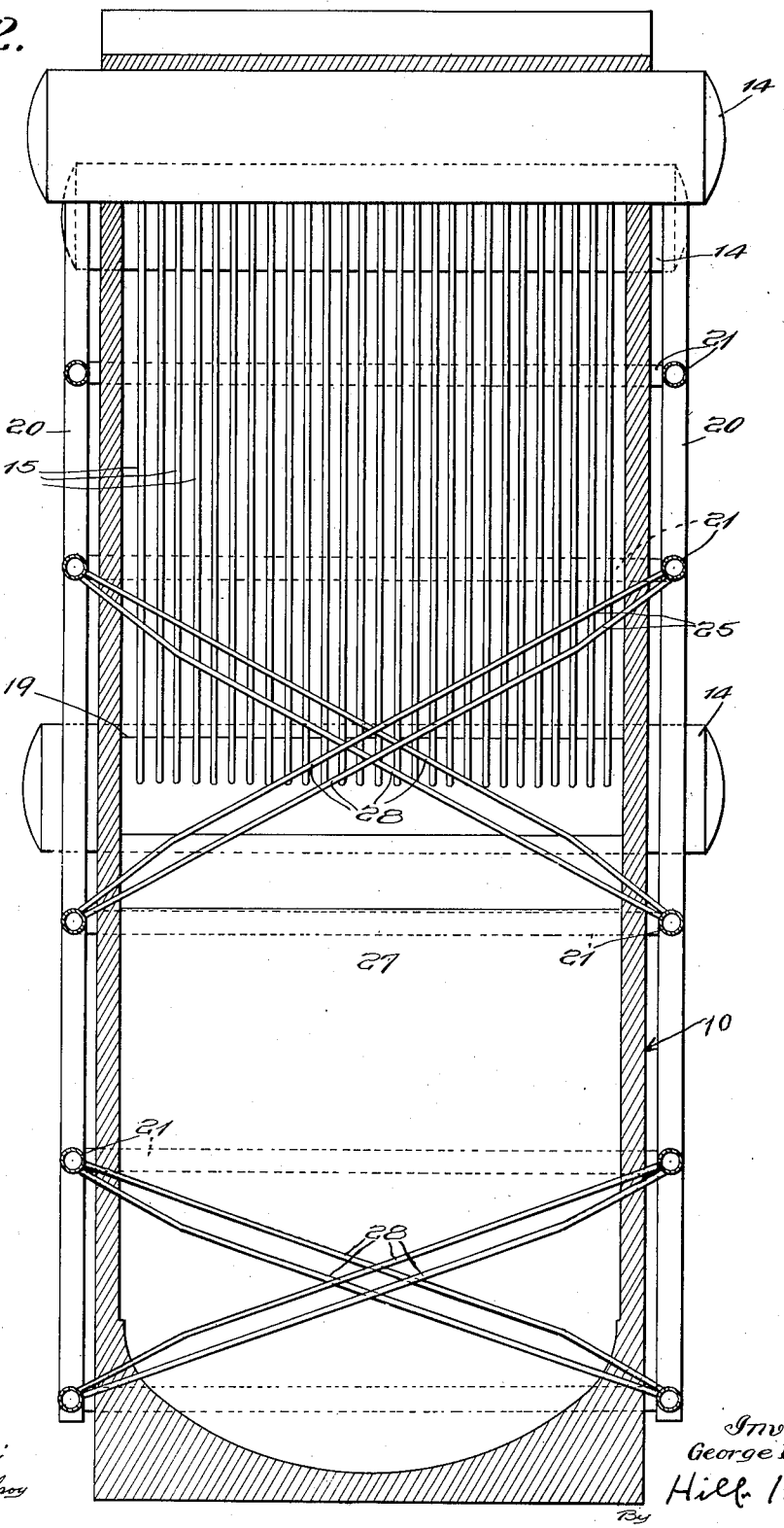

Patented Jan. 23, 1934

1,944,330

UNITED STATES PATENT OFFICE 1,944,330

MIXING BARRIER AND SLAG SCREEN

George Lasker, Chicago, Ill.

Application July 9, 1930. Serial No. 466,723

2 Claims. (Cl. 122—235)

My invention relates to furnace and boiler construction and more particularly, it relates to a novel form of screen arranged as a mixing barrier to retard and collect slag and soot coming from the flame zone of the furnace.

It is well known to those familiar with the art that a large amount of slag or soot collects or tends to collect on the side walls and ceiling of a coal-burning furnace and that the efficiency of a boiler, comprising tubes forming water cooled walls for such a furnace is greatly lowered by the collection of slag or soot on the water tubes.

The invention contemplates the use of water tubes, arranged preferably in staggered relation and so positioned as to provide a barrier preventing the free and uninterrupted flow of slag bearing gases, and, one of the objects of the invention is to provide a barrier which effectively prevents the accumulation of slag on the boiler walls.

Another object of the invention is the provision of a novel form of barrier so positioned adjacent the flame zone of a furnace as to obstruct the passage of slag materials either into or out of the flame zone and so constructed that the particles of slag will adhere to the barrier screen and thereby be prevented from contacting with the boiler tubes.

A further object of the invention is the provision of a barrier forming a cooling agent for solidifying slag material resulting from imperfect combustion in the flame zone.

Still another object of the invention is the provision of a screen barrier which serves as a collector by piling up the slag material and cooling the same.

A further object of the invention is the provision of a screen barrier suitable for collecting the slag in large quantities or in mass formation.

A still further object of the invention is the provision of a screen barrier which causes a closer intermingling of and functioning as a mixer of the rising gases of combustion.

Another object of the invention is the arrangement of a barrier so positioned as to provide a secondary combustion zone.

Still another object of the invention is the provision of a screen barrier which is self-cleaning by causing the slag to collect in mass by the cooling effect of the water tubes until the bulk of the slag collected becomes so great as to fall by its own weight.

A still further object of the invention is the provision of a screen or barrier made up of water tubes, spaced much further apart than standard boiler construction, thereby permitting the easy flow of gas when the slag formation has accumulated to its maximum limit.

Among the further objects of the invention is the provision of a barrier of the class described which is simple in construction, readily and conveniently fabricated and assembled, economically manufactured and in its construction, assembly and use provides improvements and conveniences not heretofore employed in the art for the same general purposes.

Many other objects and advantages of the construction herein described and shown will be obvious to those skilled in the art from the disclosure herein given.

To this end my invention consists in the novel construction, arrangement and combination of parts herein described and shown, and more particularly pointed out in the claims.

In the drawings, wherein like reference characters indicate like or corresponding parts, Fig. 1 is a vertical sectional view through a water tube boiler and furnace embodying the invention; and Fig. 2 is a vertical sectional view transverse to the view shown in Fig. 1.

Referring now more particularly to the drawings, the invention is shown as embodied in a furnace generally designated by the numeral 10. The furnace is enclosed by a vertical wall 11 and a roof 18 of fireproof material. The lower portion of the furnace comprises a combustion or flame zone 12 into which powdered coal or the like is fed. The upper portion of the furnace comprises an incandescent zone 13 in which are postioned a plurality of drums 14, connected by water tubes 15. The heated gases from the combustion zone ascend and pass between the tubes 15, being guided in their course by a plurality of baffles. The gases escape from the furnace through a flue outlet 16 controlled by a damper 17.

The drums 14 and water tubes 15 are supplied from a plurality of vertical pipes forming stand pipes 20 inter-connected by annular pipes 21. The heated gases from the flame or combustion zone 12 carry with them a considerable amount of soot or slag which normally is deposited on the tubes 15 and seriously effect the efficiency of the boiler system.

Deposit of soot or slag on the pipes 15 is prevented by interposing in the flame zone 12 a screen comprising a plurality of water tubes 28 connected with the annular pipes 21. The water in the tubes 28 is relatively cool and the soot or slag resulting from combustion in the flame zone collects on the tubes and the gases continue their ascent free from such soot or slag.

The screen comprises two sets of oppositely inclined tubes 28 extending diagonally in vertical planes parallel to the drums 14. One side of tubes 28 is positioned at the top of the flame zone 12 and the other at a substantial distance below the first set. By arranging each set of tubes 28 in two intersecting groups as shown, small supplementary combustion chambers are formed therebetween which operate to permit more complete combustion of the gases before their ascent through the upper ends of the tubes 28. A further advantage of this arrangement is that the upper ends of the tubes 28 will collect such of the particles of soot or slag as escape past the lower ends.

The lower set of tubes 28 is shown near the bottom of the flame or combustion zone 12 with the individual tubes in vertical alignment with the corresponding tubes of the upper set. The provision of a screen comprising two sets of tubes, one positioned near the top and the other near the bottom of the combustion or flame zone contributes to the efficiency by providing a main flame or combustion zone between two barriers, the space above the upper set or barrier providing a secondary combustion zone.

Thus, it will be seen that I have provided a novel slag screen or barrier for use in up draught furnaces whereby the heated gases of combustion carrying soot or slag are brought into intimate contact with the relatively cool water tubes. The cool tubes collect and solidify the slag and cause the same to gather in mass form, the tubes being spaced apart sufficiently to permit free passage of the gases when the accumulated slag has been built up to the point where its own weight will cause it to fall.

Having thus described my invention, it is obvious that various immaterial modifications may be made in the same without departing from the spirit of my invention; hence, I do not wish to be understood as limiting myself to the exact form, construction, arrangement and combination of parts herein shown and described for uses mentioned.

What I claim as new and desire to secure by Letters Patent is:

1. In a furnace of the kind described, a slag screen positioned below the incandescent zone of the furnace, said screen comprising a plurality of boiler tubes arranged in four groups, the tubes of each group being arranged in horizontally spaced pairs, the tubes of each pair lying in the same vertical plane and in closely spaced parallel relation for the greater portion of their length, the tubes of one of said groups being inclined to the horizontal, the tubes of a second group being oppositely inclined to the horizontal and interspersed between the tubes of the first group, the third group of tubes being positioned at a substantial distance underneath said first group and similarly inclined to the horizontal, the tubes of the fourth group being positioned at a substantial distance underneath said second group of tubes, the tubes of the fourth group being interspersed between the tubes of the third group and oppositely inclined to the horizontal.

2. In a furnace of the kind described, a slag screen positioned below the incandescent zone of the furnace, said screen comprising a plurality of boiler tubes arranged in four groups, the tubes of each group being arranged in horizontally spaced pairs, the tubes of each pair lying in the same vertical plane and being in closely spaced parallel relation for the greater portion of their length, transversely extending headers positioned one at each end of said groups, the tubes of each pair converging at their ends and connected with the adjacent header, the tubes of one of said groups being inclined to the horizontal, the tubes of the second group being oppositely inclined to the horizontal and interspersed between the tubes comprising the first group and intersecting therewith near their mid portions, the third group of tubes being positioned at a substantial distance underneath said first group and similarly inclined to the horizontal, the tubes of the fourth group being positioned at a substantial distance underneath said second group of tubes, the tubes of the fourth group being interspersed between the tubes of the third group and oppositely inclined to the horizontal and intersecting therewith near their mid portions.

GEORGE LASKER.